Figure 1:
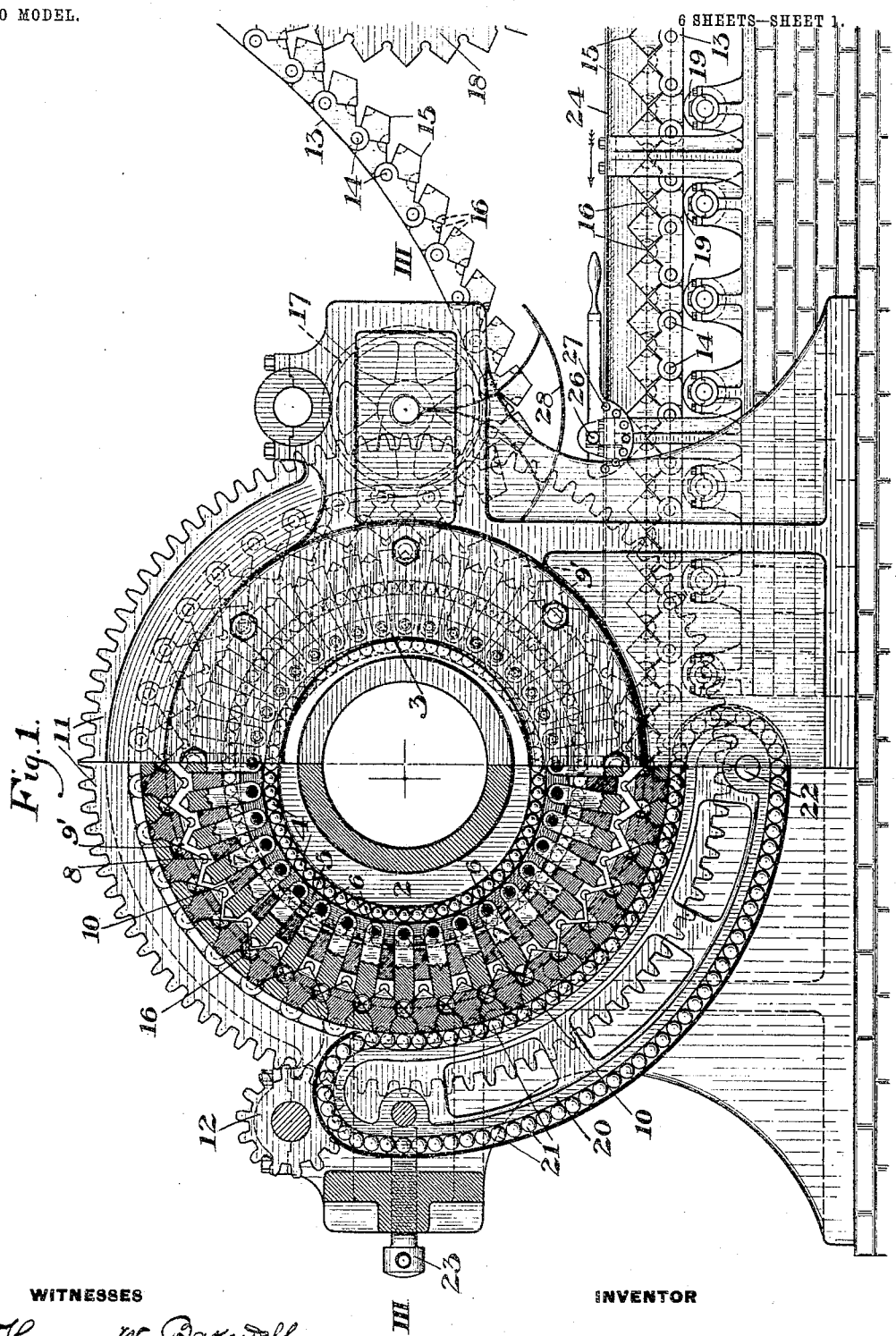

No. 765,842. PATENTED JULY 26, 1904.
J. J. JONES.
BRIQUETING MACHINE.
APPLICATION FILED JUNE 3, 1903.
NO MODEL. 6 SHEETS—SHEET 1.

WITNESSES
Thomas W. Bakewell
H. M. Corwin

INVENTOR
Joshua J. Jones

No. 765,842. PATENTED JULY 26, 1904.
J. J. JONES.
BRIQUETING MACHINE.
APPLICATION FILED JUNE 3, 1903.
NO MODEL. 6 SHEETS—SHEET 2.
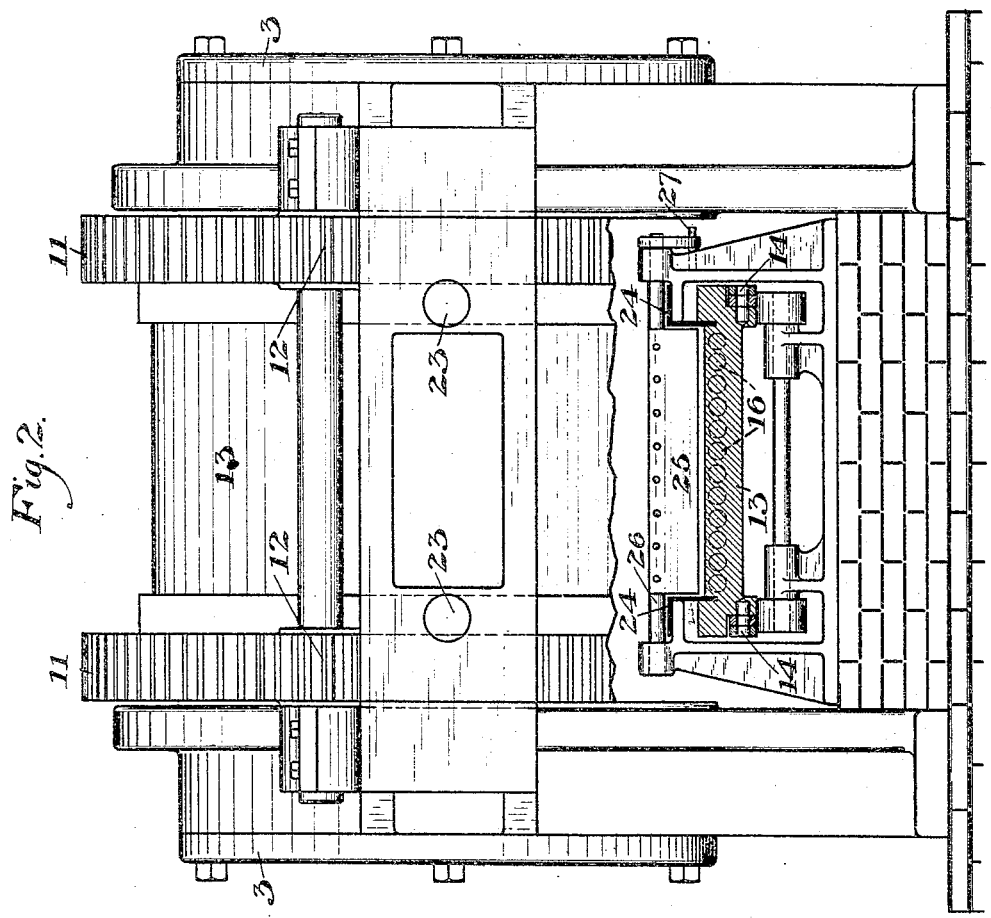
WITNESSES
INVENTOR

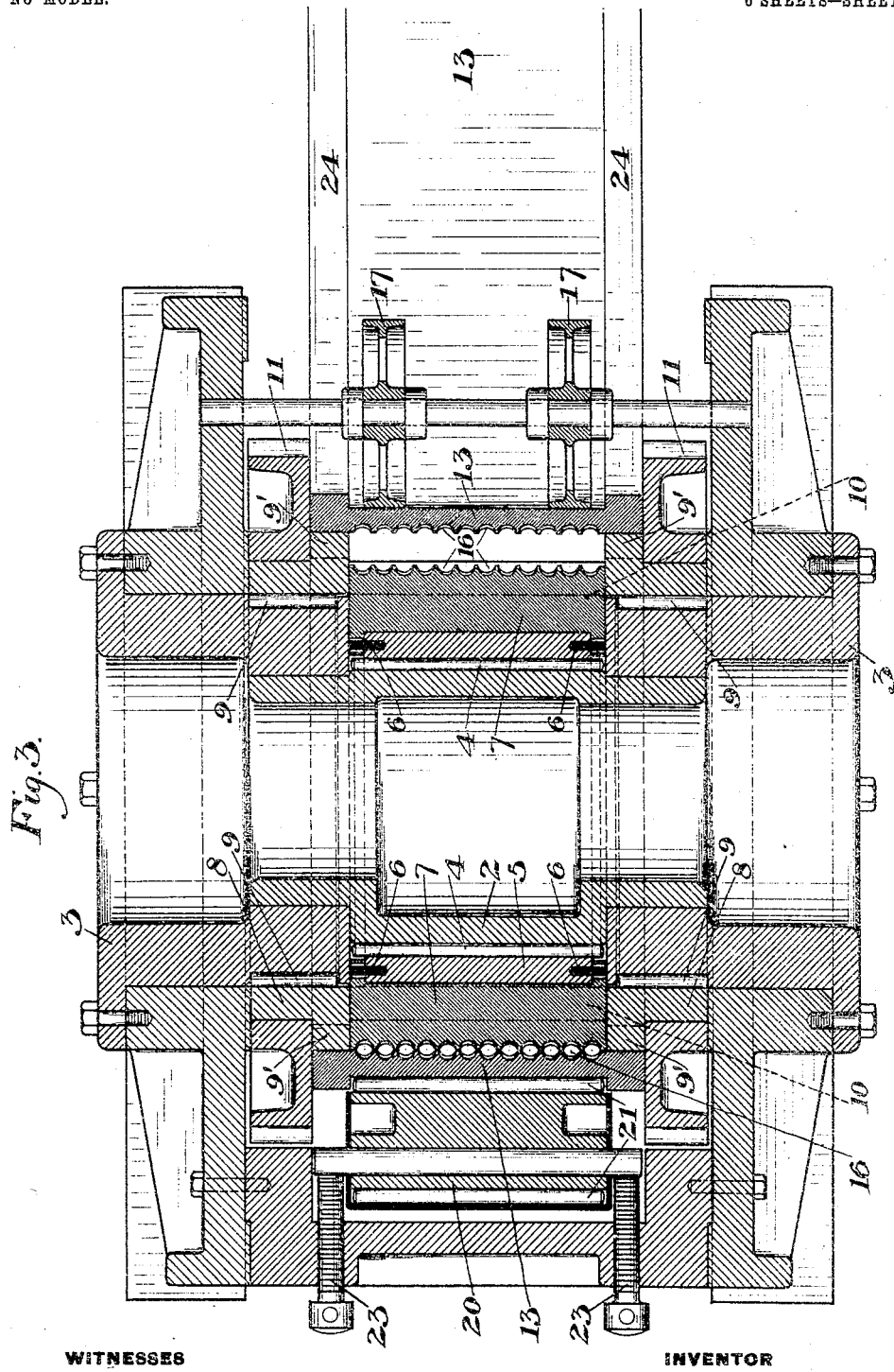

No. 765,842. PATENTED JULY 26, 1904.
J. J. JONES.
BRIQUETING MACHINE.
APPLICATION FILED JUNE 3, 1903.
NO MODEL. 6 SHEETS—SHEET 4.
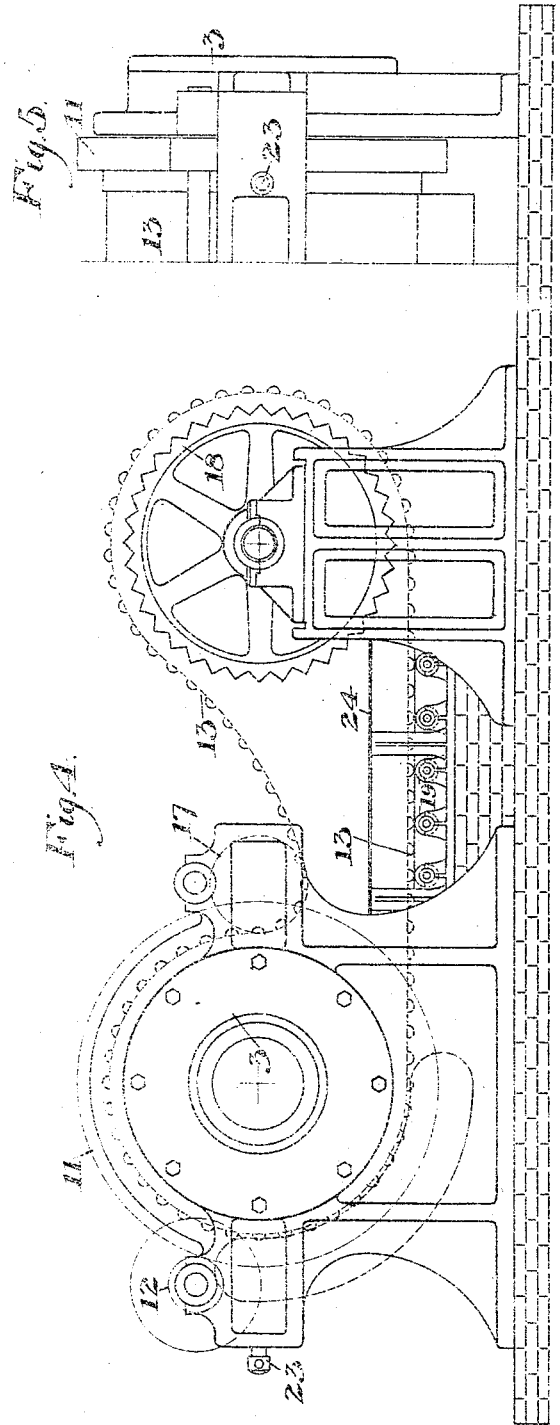
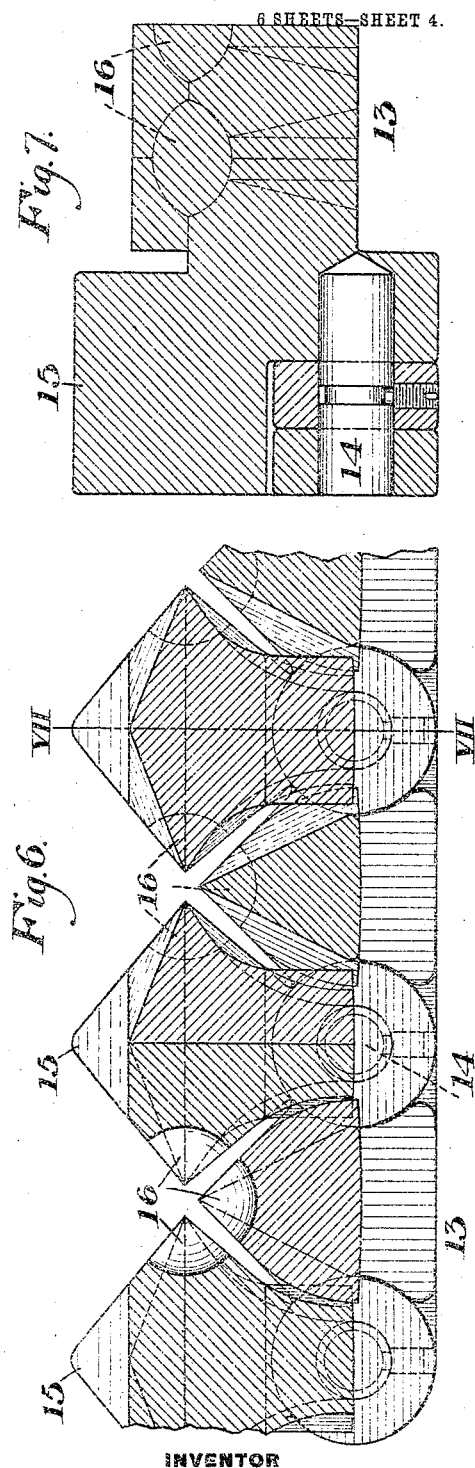

No. 765,842. PATENTED JULY 26, 1904.
J. J. JONES.
BRIQUETING MACHINE.
APPLICATION FILED JUNE 3, 1903.
NO MODEL. 6 SHEETS—SHEET 5.
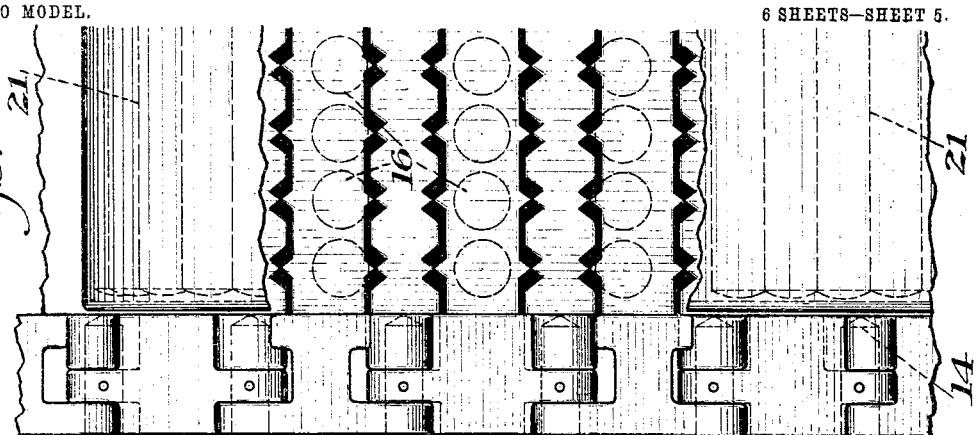
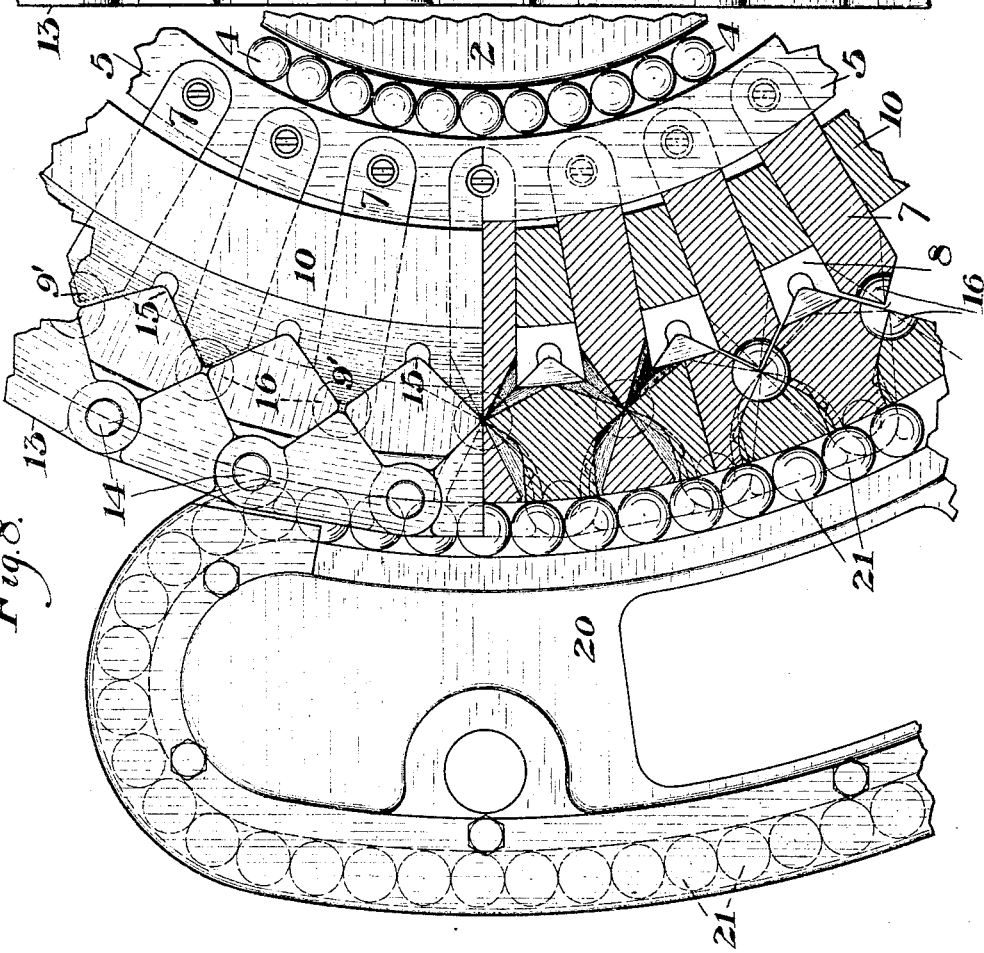
WITNESSES
Thomas W. Bakewell
H. M. Corwin
INVENTOR
Joshua J. Jones

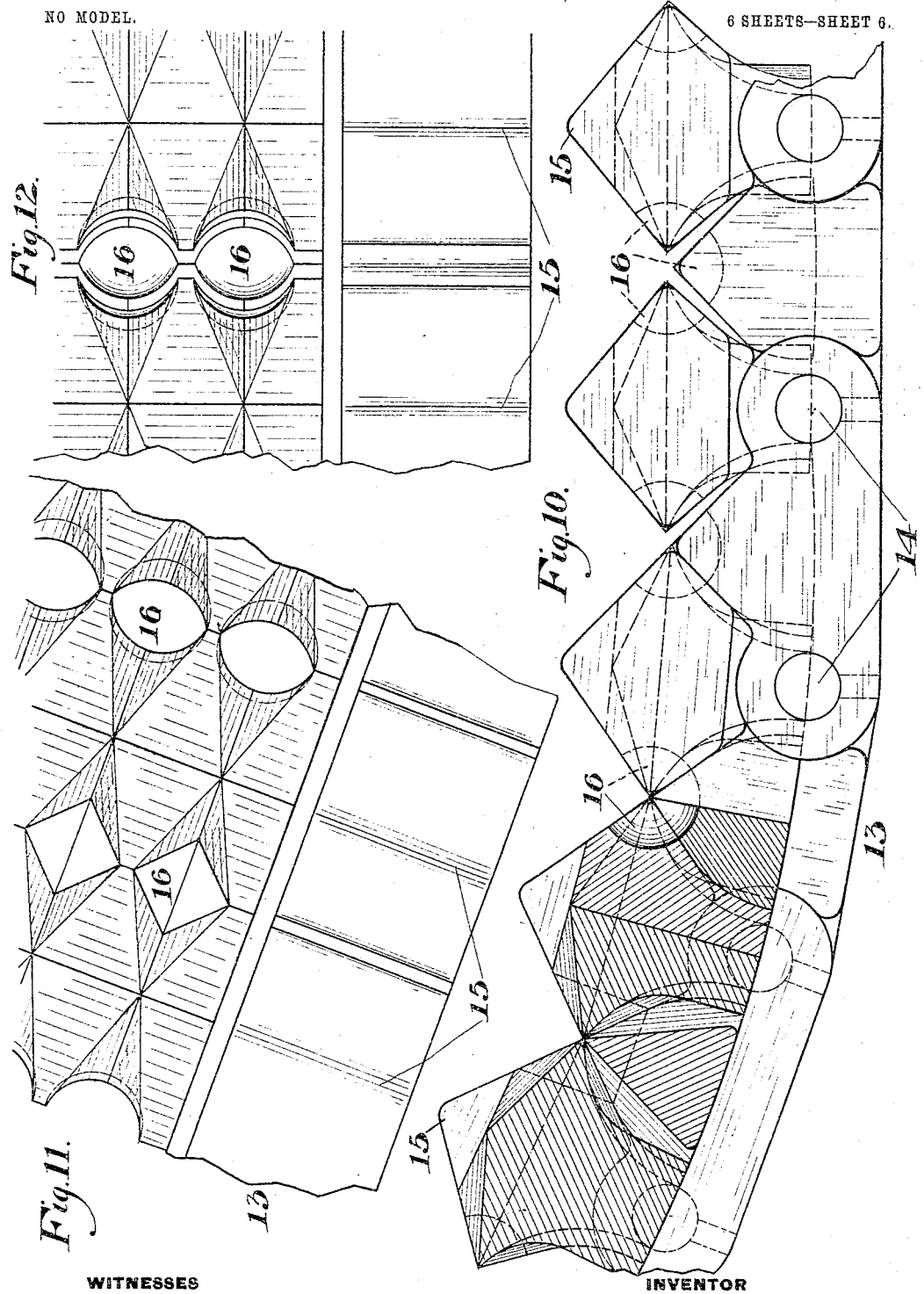

No. 765,842. Patented July 26, 1904.

UNITED STATES PATENT OFFICE.

JOSHUA J. JONES, OF PITTSBURG, PENNSYLVANIA.

BRIQUETING-MACHINE.

SPECIFICATION forming part of Letters Patent No. 765,842, dated July 26, 1904.

Application filed June 3, 1903. Serial No. 159,873. (No model.)

*To all whom it may concern:*

Be it known that I, JOSHUA J. JONES, of Pittsburg, Allegheny county, Pennsylvania, have invented a new and useful Briqueting-5 Machine, of which the following is a full, clear, and exact description, reference being had to the accompanying drawings, forming part of this specification, in which—

Figure 1 is a side elevation of my improved apparatus. Fig. 2 is an end view, partly in vertical section. Fig. 3 is a horizontal section on the line III III of Fig. 1. Fig. 4 is a side elevation, showing the machine with its connected parts. Fig. 5 is a partial end view.
Fig. 6 is a longitudinal section of a part of the mold-chain. Fig. 7 is a vertical section on the line VII VII of Fig. 6, showing part of the series of mold-cavities. Fig. 8 is a view similar to Fig. 1, but on a larger scale, showing part of the apparatus. Fig. 9 is an elevation of Fig. 8. Fig. 10 is a side elevation, partly in longitudinal section, of a portion of mold-chain, showing briquet-cavities of various forms; and Figs. 11 and 12 are plan views of Fig. 10.

The purpose of my invention is to provide means for briqueting finely-divided material—such as fine coal, ore, &c.—and bringing it into the form of cakes or lumps in which it is suitable for employment in furnaces either for the purpose of combustion where the material is coal or for the purpose of smelting where the material is ore. My machine provides means suitable for this purpose which will operate continuously and effectually by a very simple mechanism.

Referring to Fig. 1 of the drawings, 2 is a stationary eccentrically-mounted cylinder keyed to the stationary bearing 3 of the machine and having around its periphery a series of antifriction-rollers 4. These rollers are surrounded by a cylindrical carrier 5, having at its ends pins or suitable devices 6, connecting it to a series of plungers 7, which are adapted to constitute the inner surface of the mold-cavities and are projected into and retracted from the latter as the carrier 5 is rotated around the eccentric periphery of the cylinder 2. The rotation of the carrier 5 is effected by a star-wheel 8, which is mounted on series of rollers 9 on the stationary bearing 3, and the teeth 9' of the star-wheel at each end of the machine are connected by cross-webs 10, which extend between the plungers 7, so that the plungers and their carrier 5 rotate with the star-wheel, the latter being rotated by an annular gear-wheel 11, which is keyed to the star-wheel and is driven by a pinion 12.

13 is an endless chain having links which are connected together by pins 14 and have toothed portions 15, which engage the teeth of the star-wheel 7 and are carried thereby. The inner surface of these links is so shaped as to afford mold-cavities 16, which when the cavities are circular include about three-fourths of the sphere, the cavities being formed at the intersection of the link, so that when the links are passing around the star-wheel they will be closed together and will form a mold-cavity without open crevices, but that as the chain leaves the star-wheel the links will diverge and will open the cavities, so as to cause the discharge of the briquets. For this purpose I employ a guide-wheel 17, around which the mold-chain passes after it leaves the star-wheel and by which it is deflected so as to open the links.

18 is an idler-wheel at the rear end of the machine by which the chain is guided, and 19 19 are supporting-rollers on the under side of the chain at intermediate points.

Opposite the part of the chain which is passing around the star-wheel is a supporting-frame 20, by which the chain is held firmly in order to receive and resist the pressure of the plungers, and in order to diminish the friction I prefer to employ antifriction-rollers 21, which may be arranged in a continuous endless series, as shown in Fig. 1, so that these rollers may travel with the chain. The intermediate portions of the link-sections are curved to a radius equal to the radius of the plunger-carrier, as shown in Fig. 6, so as to travel smoothly on the rollers 21. The frame 20 is pivoted at 22 to the side frames of the machine and is provided with adjusting-screws 23, by which it may be adjusted toward the chain in order to keep the rollers 21 in close contact therewith.

The ends of the plungers 7 are shaped so as to complete the cavities of the molds when they are forced against the latter, and, as shown in Fig. 10, the meeting edges of the links are beveled in form, so that when the mold-cavities are closed by the passing of the links around the star-wheel they will shear through any intervening plastic material and will therefore close tightly and without crevice, and when they are opened openings will be provided for the dislodgement of particles of the briqueted material. The mold-chain may have any desired number of mold-cavities arranged across the same, and, as shown in Figs. 10 and 11, the mold-cavities may be cubical, spherical, or cylindrical, as desired.

For the purpose of feeding the plastic material to be briqueted I employ a feeding-box constituted by side pieces 24, preferably of angle-iron, the flanges of which extend vertically into grooves on the surface of the chain. The plastic material is delivered upon the chain between these side pieces and is carried on the chain under a gate 25, which presses the material loosely into the open mold-cavities. This gate is mounted eccentrically on a shaft 26, and by turning it and adjusting it by pins 27 its height above the surface of the molds can be regulated and the amount of material forced thereinto controlled.

As the mold-chain progesses in the direction of the arrow it brings the charged mold-cavities successively around the eccentric cylinder 2, where they meet with the plungers 7, and these plungers being also carried around the eccentric cylinder are projected thereby against the mold-cavities, pressing the plastic material firmly thereinto and forming the briquets. As the molds progress beyond the middle point of the machine the plungers are successively retracted, and as the chain passes around the guide-wheel 17 the sections of the chain are spread apart, as above explained, and the briquets dropped from the mold-cavities into a chute or conveyer 28, by which they are conveyed to a suitable drying or baking apparatus.

The advantages of the apparatus will be appreciated by those skilled in the art. Its capacity and its rate of output are very large, its mechanism is simple, and it forms compact briquets which are better in cohesion than those produced by any other chain-mold mechanism known to me.

I believe I am the first to combine with a chain-mold a series of radially-movable plungers interiorly mounted independently of the chain and adapted to act thereon as the chain passes around the plunger-carrier, and within the scope of my invention as defined in the claims the mechanism may be varied in many ways by the skilled mechanic, since

What I claim is—

1. A briqueting-machine having a mold-chain with mold-cavities on the inner side thereof, radially-movable plungers mounted on a rotary carrier independently of, but within, the chain, means for carrying the chain along the plungers, and means for forcing the plungers against the mold-cavities; substantially as described.

2. A briqueting-machine having a mold-chain with mold-cavities on the inner side thereof, radially-movable plungers mounted on a cylindrical carrier independently of, but within, the chain and adapted to travel therewith for a portion of the length of the chain, and means for forcing the plungers against the mold-cavities; substantially as described.

3. A briqueting-machine having an endless mold-chain with mold-cavities on the inner side thereof, and a carrier provided with radially-movable plungers around which the mold-chain passes; substantially as described.

4. A briqueting-machine having an endless mold-chain with mold-cavities on the inner side thereof, and an eccentrically-mounted carrier provided with plungers around which the mold-chain passes; substantially as described.

5. A briqueting-machine having a mold-chain with mold-cavities on the inner side thereof, and a cylindrical carrier provided with radially-movable plungers around which the mold-chain passes; substantially as described.

6. A briqueting-machine having a mold-chain with mold-cavities on the inner side thereof, a carrier provided with radially-movable plungers around which the mold-chain passes, and a toothed wheel adapted to move the carrier and the mold-chain; substantially as described.

7. A briqueting-machine having a mold-chain with mold-cavities on the inner side thereof, a carrier provided with radially-movable plungers around which the mold-chain passes, and a series of roller-bearings around which the carrier moves; substantially as described.

8. A briqueting-machine having a mold-chain with mold-cavities thereon, radially-movable plungers mounted on a rotary carrier independently of, but within, the chain, means for carrying the chain along the plungers, means for forcing the plungers against the mold-cavities, and a backing-support for the outer side of the chain opposite to the place of action of the plungers; substantially as described.

9. A briqueting-machine having a mold-chain with mold-cavities on the inner side thereof, radially-movable plungers mounted on a cylindrical carrier independently of, but within, the chain, means for carrying the chain along the plungers, means for forcing the plungers against the mold-cavities, and antifriction-rollers between the molds and the backing-support; substantially as described.

10. A briqueting-machine having a mold-chain with mold-cavities therein, said chain being constituted of links, each link having a plurality of separable parts with beveled, interfitting edges, said link parts coöperating to form the mold-cavities; substantially as described.

11. A briqueting-machine having a mold-chain with mold-cavities on the inner side thereof, a plunger-carrier around which the mold-chain passes, and a guide around which the chain passes after it leaves the plunger-carrier, and by which the sections of the chain are spread; substantially as described.

12. A briqueting-machine having a mold-chain with mold-cavities thereon, a carrier provided with plungers around which the mold-chain passes, and a toothed wheel adapted to move the carrier and the mold-chain, said toothed wheel having portions extending between the plungers; substantially as described.

13. A briqueting-machine having a mold-chain with mold-cavities thereon arranged in groups across the inner side of the chain, plungers eccentrically mounted on a rotary carrier independently of the chain, means for carrying the chain along the plungers, and means for forcing the plungers against the mold-cavities; substantially as described.

14. A briqueting-machine having a mold-chain with mold-cavities on the inner side thereof, a cylindrical carrier provided with radially-movable plungers around which the mold-chain passes, and antifriction-rollers within the carrier; substantially as described.

15. A briqueting-machine having a mold-chain with mold-cavities on the inner side thereof, said chain having links which are pivoted together at their back or outer sides, and rollers bearing against the back sides of said links during at least a portion of their travel; substantially as described.

16. In a briqueting-machine, a mold-chain with mold-cavities thereon, said chain having links with both straight end portions and intermediate curved portions on their backs, rollers contacting with the straight portions during the insertion of the material, and other rollers bearing on the curved portions of the links during the compression of the material; substantially as described.

In testimony whereof I have hereunto set my hand.

JOSHUA J. JONES.

Witnesses:
THOMAS W. BAKEWELL,
H. M. CORWIN.